US012764111B2

(12) United States Patent
Forand et al.

(10) Patent No.: US 12,764,111 B2
(45) Date of Patent: Oct. 13, 2026

(54) AUTOMATED MULTI-FACTOR AUTHENTICATION ENFORCEMENT DURING ADMINISTRATIVE ACCOUNT LIFECYCLE EVENTS

(71) Applicant: Hartford Fire Insurance Company, Hartford, CT (US)

(72) Inventors: Lori-Ann Forand, Enfield, CT (US); Timothy R. Keefe, West Hartford, CT (US); Donella King-Smith, Fairmont, NE (US); David Maraia, New Hartford, CT (US); Aurelio Miguel, Newington, CT (US); Colleen Ryan, Manchester, CT (US); Annadurai Shanmugam, Plainsville, CT (US); Anshuman Upadhyay, South Windsor, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 167 days.

(21) Appl. No.: 18/907,214

(22) Filed: Oct. 4, 2024

(65) Prior Publication Data

US 2026/0100948 A1 Apr. 9, 2026

(51) Int. Cl.
*H04L 9/40* (2022.01)

(52) U.S. Cl.
CPC .......... *H04L 63/0876* (2013.01); *H04L 63/20* (2013.01)

(58) Field of Classification Search
CPC ............................ H04L 63/0876; H04L 63/20
USPC ............................................................ 726/6
See application file for complete search history.

(56) References Cited

U.S. PATENT DOCUMENTS

| | | | | |
|---|---|---|---|---|
| 10,212,588 | B2 | 2/2019 | Grim et al. | |
| 10,833,859 | B2 | 11/2020 | Mullen et al. | |
| 10,868,672 | B1 * | 12/2020 | Farrugia | H04L 9/0861 |
| 11,140,171 | B1 * | 10/2021 | Friedman | H04L 9/0861 |
| 12,008,332 | B1 * | 6/2024 | Gardner | G06F 40/56 |
| 2005/0140497 | A1 * | 6/2005 | Chiviendacz | B42D 25/00 340/5.67 |
| 2005/0144450 | A1 * | 6/2005 | Voice | H04W 12/06 713/169 |
| 2005/0144451 | A1 * | 6/2005 | Voice | H04L 63/104 713/170 |
| 2006/0015725 | A1 * | 1/2006 | Voice | H04L 9/3273 713/168 |

(Continued)

*Primary Examiner* — Teshome Hailu
(74) *Attorney, Agent, or Firm* — Buckley, Maschoff & Talwalkar LLC

(57) ABSTRACT

A Multi-Factor Authentication ("MFA") tool may implement an enforcement system for an enterprise. The tool may scan a computing environment along with an employee and account data store to automatically detect administrative account lifecycle events for the enterprise. The employee and account data store may contain, for example, electronic records associated with a plurality of employees and cloud computing accounts for the enterprise. Responsive to the identified administrative account lifecycle events, modifications to MFA requirements may be automatically determined. Responsive to that determination, embodiments may automatically implement second factor mappings to enforce the MFA requirements. The second factor mappings might be associated with, for example, mobile phone numbers, hardware tokens, or biometric information.

16 Claims, 17 Drawing Sheets

(56) References Cited

U.S. PATENT DOCUMENTS

| | | | | |
|---|---|---|---|---|
| 2007/0005967 | A1* | 1/2007 | Mister | G06Q 10/107 713/168 |
| 2015/0382195 | A1 | 12/2015 | Grim et al. | |
| 2019/0182044 | A1 | 6/2019 | Mullen et al. | |
| 2023/0015583 | A1* | 1/2023 | Merchant | H04M 3/5183 |

* cited by examiner

Remove Phone ID Mapping

1400

| EMPLOYEE ID 1402 | ACCOUNT STATUS 1404 | MFA REQUIREMENT 1406 | CURRENT MFA 1408 | ... | STATUS 1410 |
|---|---|---|---|---|---|
| EE_10001 | ADMINISTRATIVE | TWO FACTOR REQUIRED | ONE FACTOR | | ADD MFA |
| EE_10002 | NON-ADMINISTRATIVE | TWO FACTOR NOT REQUIRED | ONE FACTOR | | NO ACTION |
| EE_10003 | ADMINISTRATIVE | TWO FACTOR NOT REQUIRED | TWO FACTOR | | NO ACTION |
| EE_10004 | NON-ADMINISTRATIVE | TWO FACTOR NOT REQUIRED | TWO FACTOR | | REMOVE MFA |

FIG. 14

AUTOMATED MULTI-FACTOR AUTHENTICATION ENFORCEMENT DURING ADMINISTRATIVE ACCOUNT LIFECYCLE EVENTS

TECHNICAL FIELD

The present application generally relates to computer systems and more particularly to computer systems that are adapted to accurately, securely, and/or automatically support role-based multi-factor authentication enforcement scope changes for an enterprise.

BACKGROUND

An enterprise, such as an insurer, may provide computing accounts to employees to perform administrative activities. Administrative accounts may have certain privileges that allow them to access or alter information, the ability to perform various sensitive functions, etc. Passwords may be required to access these administrative accounts to protect the enterprise. However, passwords alone are not sufficient to protect business assets because they have become too easy for threat actors to compromise. It is important to protect accounts having access to sensitive business assets by enabling Multi-Factor Authentication ("MFA") as an added layer of security. The National Institute of Standards and Technology ("NIST") cybersecurity framework for MFA and many other regulatory compliance bodies (such as the New York Department of Financial Services ("NY-DFS")) now require MFA for access to the most critical assets in an organization.

The NYDFS emphasizes the importance of ensuring MFA for all accounts that have administrative access. Specifically, MFA should be enabled for all remote access and for all privileged accounts (accounts of individuals who perform administrative functions). It requires a user to provide a combination of two or more of the following:

- something you know (like a password or PIN),
- something you have (like a smart card or security key), and
- something you are (like your fingerprint, facial recognition, or retina scan).

Accounts may be considered "administrative" accounts when they become a member of administrative groups. Often, when an account gets added as a member of administrative groups, it is up to the account owner to request MFA using a ticketing system.

It would be desirable to provide improved systems and methods to accurately and/or automatically support MFA enforcement for an enterprise. Moreover, the results should be easy to access, understand, interpret, update, etc.

SUMMARY OF THE INVENTION

According to some embodiments, systems, methods, apparatus, computer program code and means are provided to accurately and/or automatically support account based MFA enforcement for an enterprise in a way that provides fast, secure, and useful results and that allows for flexibility and effectiveness when responding to those results.

Some embodiments are directed to an MFA tool that implements an enforcement system for an enterprise. The tool may scan a computing environment along with an employee and account data store to automatically detect administrative account lifecycle events for the enterprise. The employee and account data store may contain, for example, electronic records associated with a plurality of employees and cloud computing accounts for the enterprise. Responsive to the identified administrative account lifecycle events, modifications to MFA requirements may be automatically determined. Responsive to that determination, embodiments may automatically implement second factor mappings to enforce the MFA requirements. The second factor mappings might be associated with, for example, mobile phone numbers, hardware tokens, or biometric information.

Some embodiments comprise: means for scanning, by a computer processor of an MFA tool, a computing environment along with an employee and account data store to automatically detect administrative account lifecycle events for an enterprise, wherein the employee and account data store that contains electronic records associated with a plurality of employees and cloud computing accounts for the enterprise; responsive to the identified administrative account lifecycle events, means for automatically determining modifications to MFA requirements; and responsive to the determination, means for automatically implementing second factor mappings to enforce the MFA requirements.

In some embodiments, a communication device associated with a back-end application computer server exchanges information with remote devices in connection with interactive graphical user interfaces. The information may be exchanged, for example, via public and/or proprietary communication networks.

A technical effect of some embodiments of the invention is improved and computerized support of role-based MFA enforcement for an enterprise that provides fast, secure, and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 14 is a portion of an MFA enforcement database according to some embodiments.

DETAILED DESCRIPTION

Figure 1:
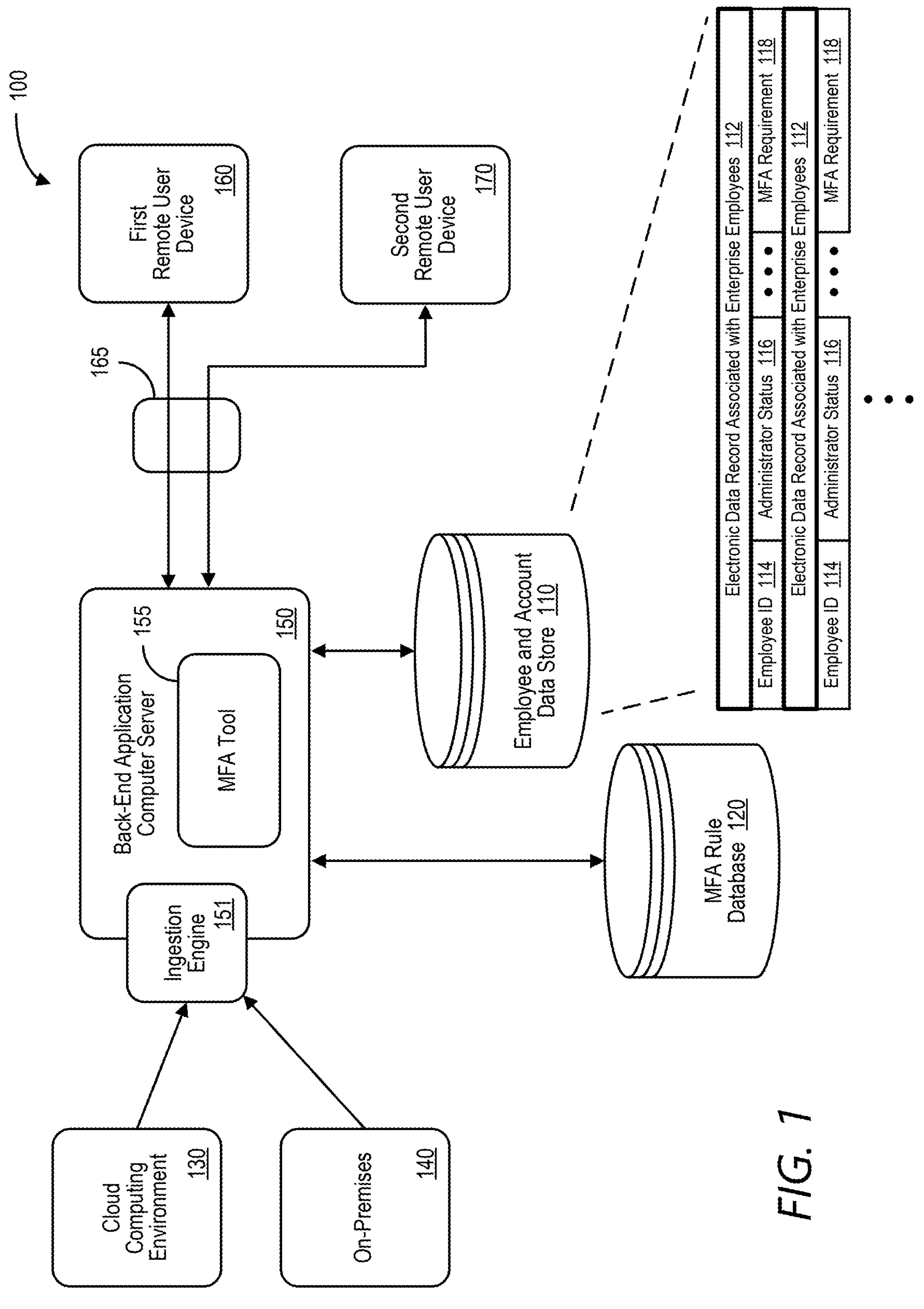
FIG. 1 is a high-level block diagram of an enterprise system in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data processing associated with an MFA system. The present invention is directed to more than merely a computer implementation of a routine or conventional activity previously known in the industry as it provides a specific advancement in the area of MFA enforcement by providing improvements in the operation of a computer system that automatically implements MFA requirements. The present invention provides improvement beyond a mere generic computer implementation as it involves the novel ordered combination of system elements and processes to provide improvements in the speed, security, and accuracy of such an MFA tool for an enterprise. Some embodiments of the present invention are directed to a system adapted to automatically handle computer account changes, aggregate data from multiple data sources, automatically generate MFA updates to reduce unnecessary messages or communications, etc. (e.g., to consolidate communications between parties within an enterprise). Moreover, communication links and messages may be automatically established, aggregated, formatted, modified, removed, exchanged, etc. to improve network performance (e.g., by reducing an amount of network messaging bandwidth and/or storage required to create MFA enforcement messages or alerts, improve security, reduce the size of data stores, more efficiently collect, present, and utilize MFA information, etc.).

Some embodiments described herein provide for automated MFA enforcement tool. FIG. 1 is a high-level block diagram of an enterprise MFA enforcement system 100 that may be provided according to some embodiments of the present invention. In particular, the system 100 includes a back-end application computer server 150 that may access information in an employee and account data store 110 (e.g., storing a set of electronic records associated with enterprise employees and computer accounts 112, each record including, for example, one or more employee identifiers 114, administrator status 116, MFA requirements 118, etc.). The back-end application computer server 150 may also store information into other data stores, such as an MFA rule database 120, and utilize an ingestion engine 151 and an MFA tool 155 to exchange and process messages and view, analyze, and/or update electronic records. The back-end application computer server 150 may also exchange information with a first remote user device 160 and a second remote user device 170 (e.g., via a firewall 165). According to some embodiments, an interactive graphical user interface platform of the back-end application computer server 150 may facilitate the creation and review of MFA enforcement information, recommendations, alerts, and/or the display of results via one or more remote administrator computers (e.g., to summarize system 100 performance) and/or the remote user devices 160, 170. For example, the first remote user device 160 may transmit annotated and/or updated information to the back-end application computer server 150. Based on the updated information, the back-end application computer server 150 may adjust data in the employee and account data store 110 and/or the MFA rules database 120 and the change may (or may not) be used in connection with the second remote user device 170. Note that the back-end application computer server 150 and/or any of the other devices and methods described herein might be associated with a third party, such as a vendor that performs a service for an enterprise. In some cases, the ingestion engine 151 may receive information about a cloud computing environment 130 and/or on-premises systems 140.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the automated access and/or update of electronic records in the data stores 110, 120 and/or the management of user accounts and access. As used herein, the term "automated" may refer to, for example, actions that can be performed with little (or no) intervention by a human.

Devices, including those associated with the back-end application computer server 150 and any other apparatus described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the employee and account data store 110 and/or the MFA rules database 120. The data stores 110, 120 may be locally stored or reside remote from the back-end application computer server 150. As will be described further below, the employee and account data store 110 may be used by the back-end application computer server 150 in connection with an interactive user interface to facilitate MFA enforcement for an enterprise. Although a single back-end application computer server 150 is shown in FIG. 1, any number of such devices may be included. Moreover, various devices described herein might be combined according to embodiments of the present invention. For example, in some embodiments, the back-end application computer server 150 and employee and account data store 110 might be co-located and/or may comprise a single apparatus.

Figure 2:
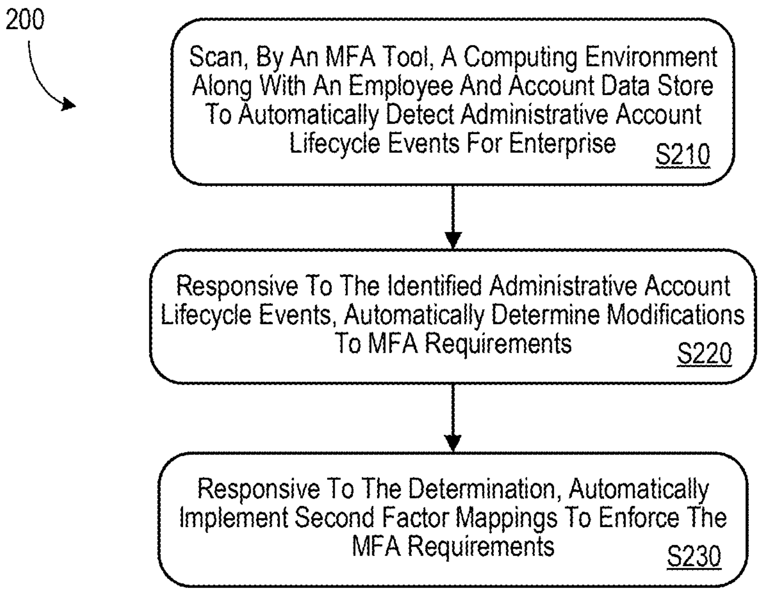
FIG. 2 illustrates a method according to some embodiments.

The elements of the system 100 may work together to perform the various embodiments of the present invention. Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of an MFA tool may scan a computing environment along with an employee and account data store to automatically detect administrative account lifecycle events for the enterprise. The employee and account data store may, for example, contain electronic records associated with a plurality of employees and cloud computing accounts for the enterprise. As used herein, the phrase "lifecycle events" might refer to, for example, onboarding a newly hired employee of the enterprise, an indication that an employee has a new role, an employee termination, etc. According to some embodiments, the MFA tool communicates with a framework of policies and technologies to ensure that the right users have the appropriate access to technology resources (e.g., Identity and Access Management ("IAM")) tool and the computing environment is associated with an application protocol for accessing and maintaining distributed directory information services over an IP network (e.g., Lightweight Directory Access Protocol ("LDAP")). In some embodiments, the automatic detection of an administrative account lifecycle event is associated with an Information Technology ("IT") ticketing application.

Responsive to the identified administrative account lifecycle events, the MFA tool may automatically determine modifications to MFA requirements at S220. Responsive to that determination, the MFA tool may automatically implement second factor mappings to enforce the MFA requirements at S230. The second factor mappings might be associated with mobile phone numbers, hardware tokens, biometric information, etc.

In this way, embodiments may provide an automated process in which an IAM tool scans the LDAP environment to identify any accounts that require MFA criteria, such as members of server administrative groups of Windows, Linux, and/or Oracle environments. The employee data, including current MFA requirements, may be received through an automated feed and may include Personal Identifiable Information ("PII"), such as any representation of information that permits the identity of an individual to whom the information applies to be reasonably inferred by either direct or indirect means. This information is consumed by the IAM tool and an MFA tool for user enrollment and second factor mapping. In the case of an employee termination (or if the employee is on a long-term disability), the IAM tool might automatically remove both MFA access and the second factor mapping.

Figure 3A:
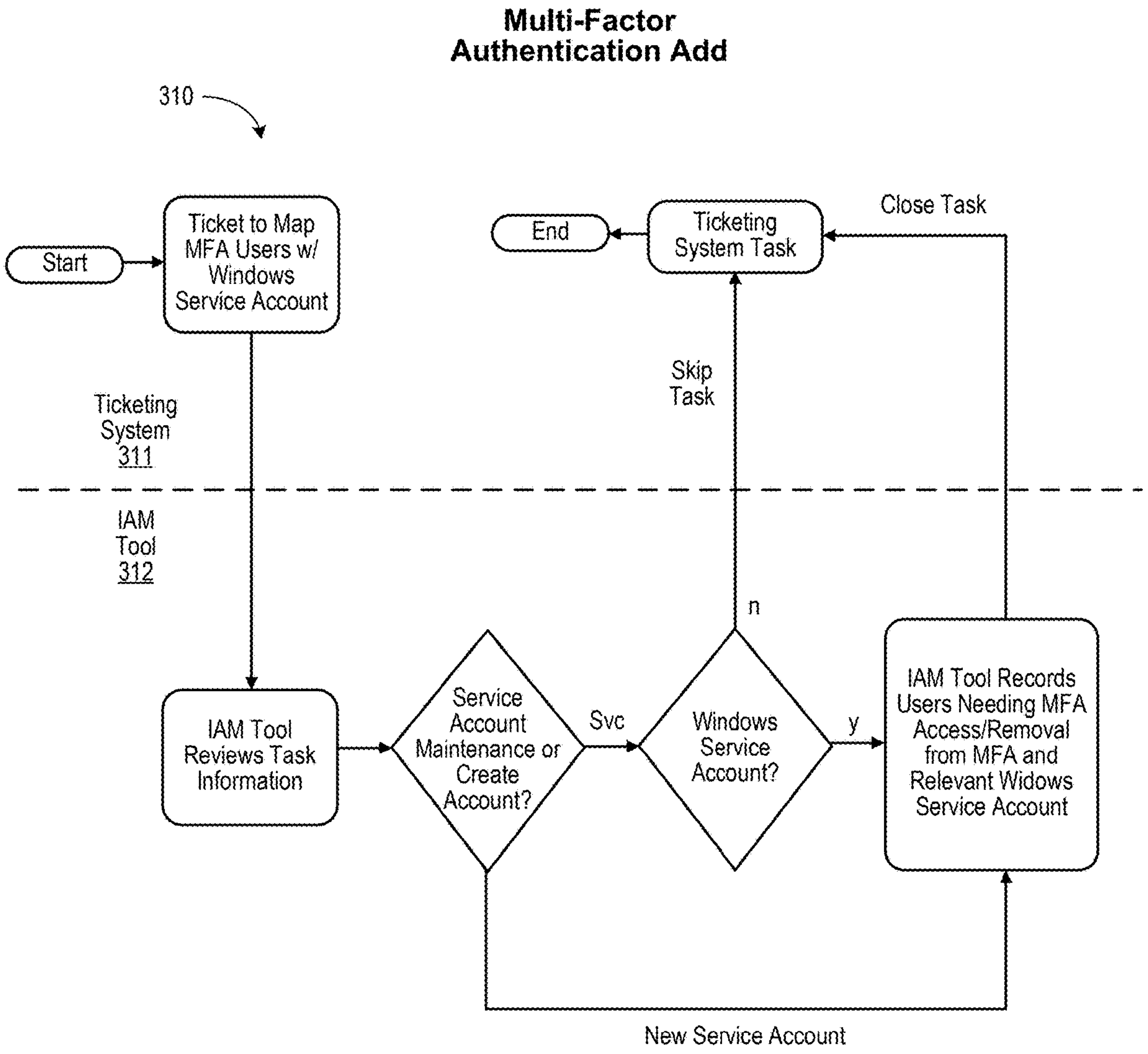
FIGS. 3A through 3C are an automated MFA add workflow in accordance with some embodiments.
Figure 3B:
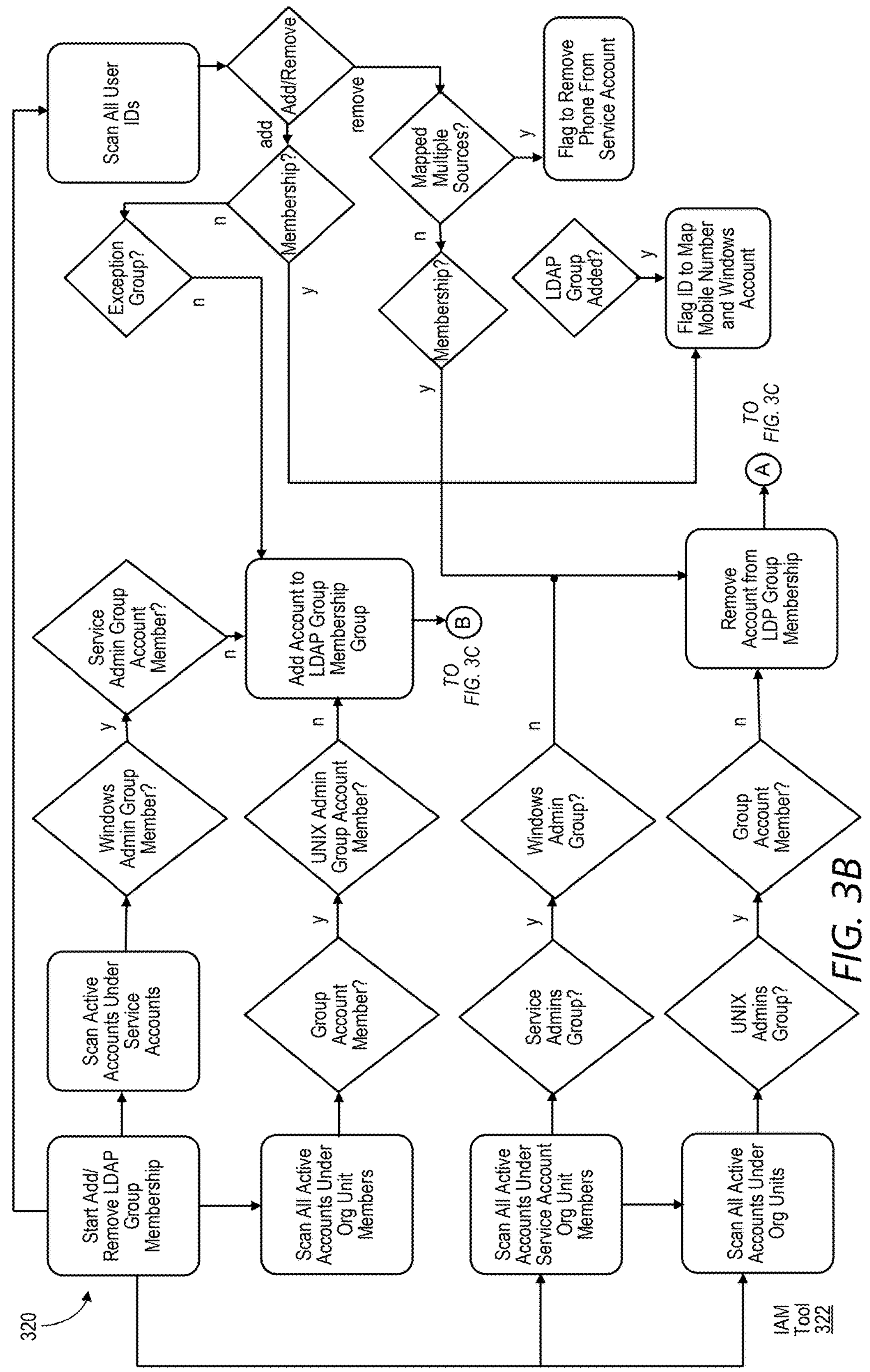
Figure 3C:
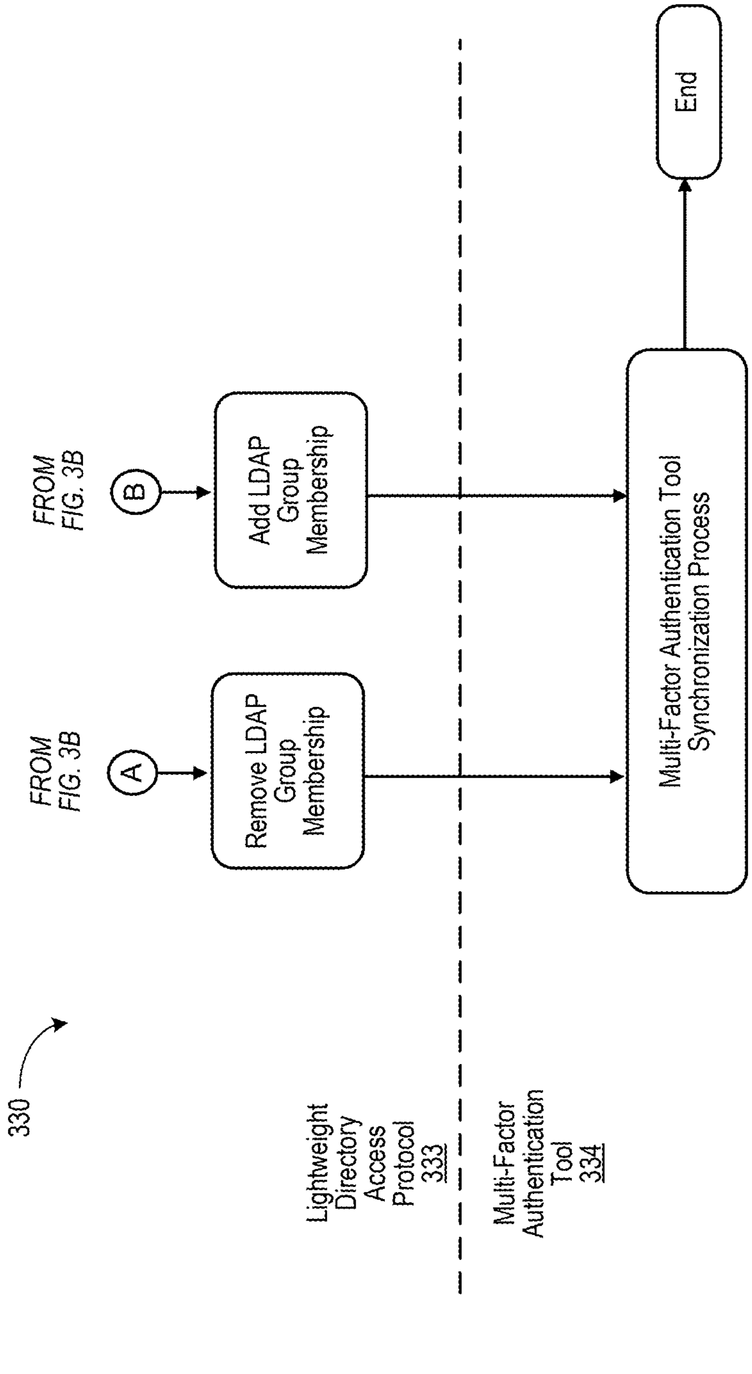

FIGS. 3A through 3C are an automated MFA add workflow in accordance with some embodiments. In particular, FIG. 3A is a workflow 310 associated with a ticketing system 311 and an IAM tool 312. The workflow 310 may create a ticket to map MFA users with Windows service accounts causing the IAM tool to review task assignments. If the ticket is associated with service account maintenance and the service account is not a Windows service account, the task is skipped and the workflow ends. If the ticket is associated with creating a new account (or the maintenance is for a Windows service account), the IAM tool records that the user needs MFA access or removal from MFA access and closes the ticketing system task.

FIG. 3B is a workflow 320 associated with an IAM tool 322. When the workflow 320 begins by starting an add/delete process for LDAP group membership. For example, the workflow 320 may scan active accounts (e.g., all identifiers collected in add/delete group membership as produced by FIG. 3A) under service accounts. If an account is a Windows administrative group member account but not a member of the server administrative group, the workflow 320 will add the account to LDAP group membership. Similarly, the workflow 320 may scan active accounts under certain organization unit members. If an account is a group account member but not a member of UNIX administrative groups, the workflow 320 will add the account to LDAP group membership and continue at (B) in FIG. 3C.

With respect to removing LDAP group membership, the workflow 320 may scan all active accounts under service accounts of organization unit members. If the account is a member of the server administrative group but not a member of a Windows administrative group, the workflow 320 will remove the account from LDAP group membership. Similarly, if the account is a member of the UNIX administrative group but not a member of an SU group, the workflow 320 will remove the account from LDAP group membership and continue at (A) in FIG. 3C.

If the add/delete process for LDAP group membership was to add and the user membership is present but the user is not in an exception group, the workflow 320 will add the account to the LDAP as before. If the user membership was not present, the workflow 320 may flag identifier to a mobile number. If the add/delete process was to remove, the workflow 320 will check a mobile phone map (as described herein), and if the phone identifier is mapped to multiple accounts the phone is removed from the account. If the phone identifier is not mapped to multiple accounts, and membership is present, the workflow 320 removes the account from the LDAP group. FIG. 3C is a workflow 330 associated with an LDAP 333 and an MFA tool 334. When adding an account to LDAP, the workflow 330 may execute an MFA synchronization process before ending. Similarly, when removing an account from LDAP, the workflow 330 may execute the MFA synchronization process before ending.

Figure 4:
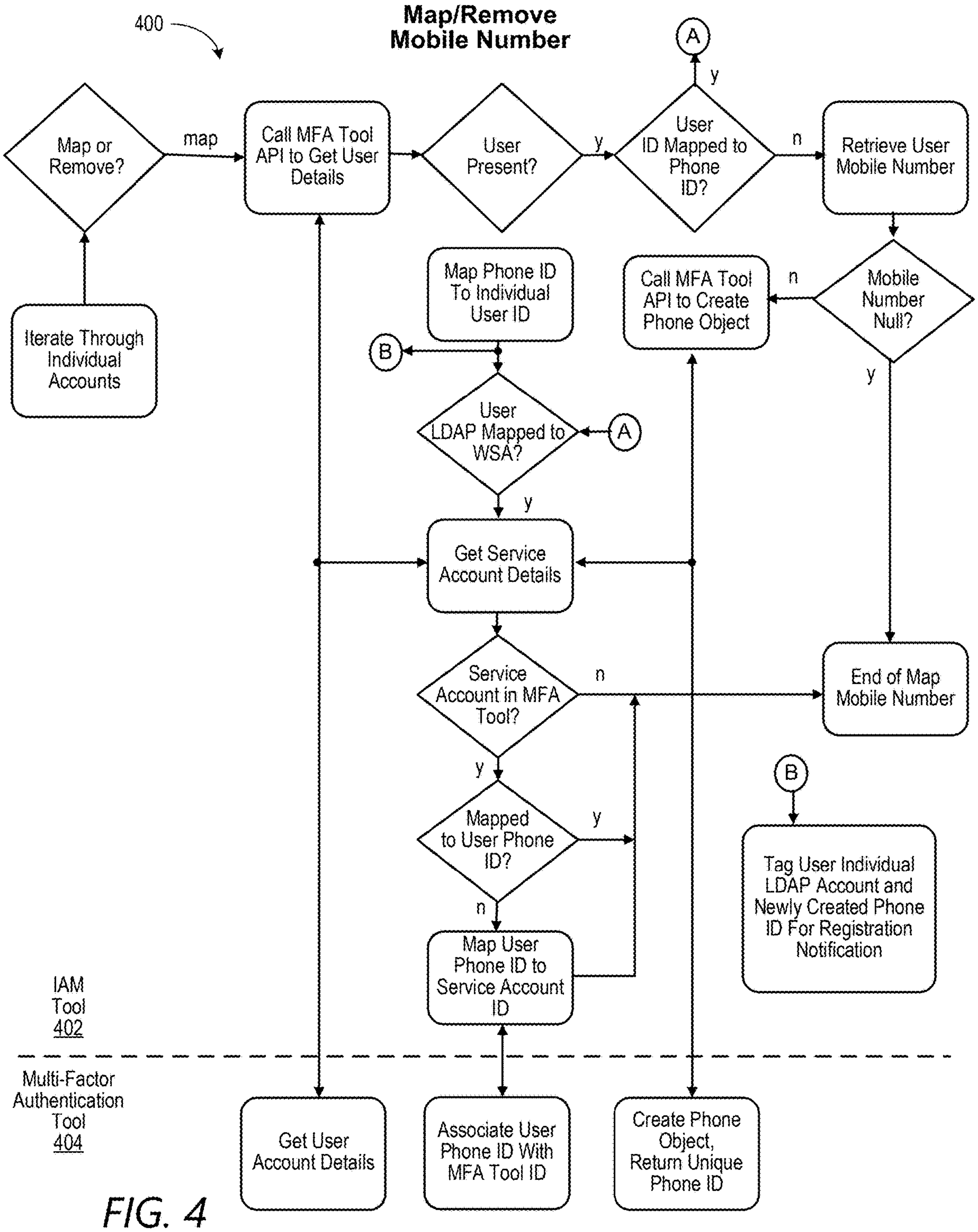
FIG. 4 is an automated map/remove mobile number workflow according to some embodiments.

FIG. 4 is an automated map/remove mobile number workflow 400 for an IAM tool 402 and an MFA tool 404 according to some embodiments. The IAM tool 402 iterates through individual accounts. Those that are flagged as "removed" are processed as described in FIG. 7. Those that are processed as "map mobile number" result in a call from the IAM tool 402 to the MFA tool 404 to get user details for that account (e.g., user and phone identifiers).

If the user is not present, no further step will be taken. If the user is present and the user identifier is mapped to a phone identifier in the MFA tool, the user mobile number is retrieved (a null number resulting in the end of the workflow 400), and the MFA tool 404 is called to create a phone object and get the new phone identifier. Next (or if the user was present and the user identifier was already mapped to a phone identifier in the MFA tool 404), it is determined if the user LDAP is mapped to a Windows service account. If so, the service account details are obtained from the MFA tool. If there is no service account in the MFA tool 404 or it is already mapped to a phone identifier, the workflow 400 ends. Otherwise, the user phone identifier is mapped to the service account identifier and the workflow 400 ends. Mapping the phone identifier with individual user identifier also results in tagging the user individual LDAP account and newly created phone identifier for registration notification as described in connection with FIG. 5.

Figure 5:
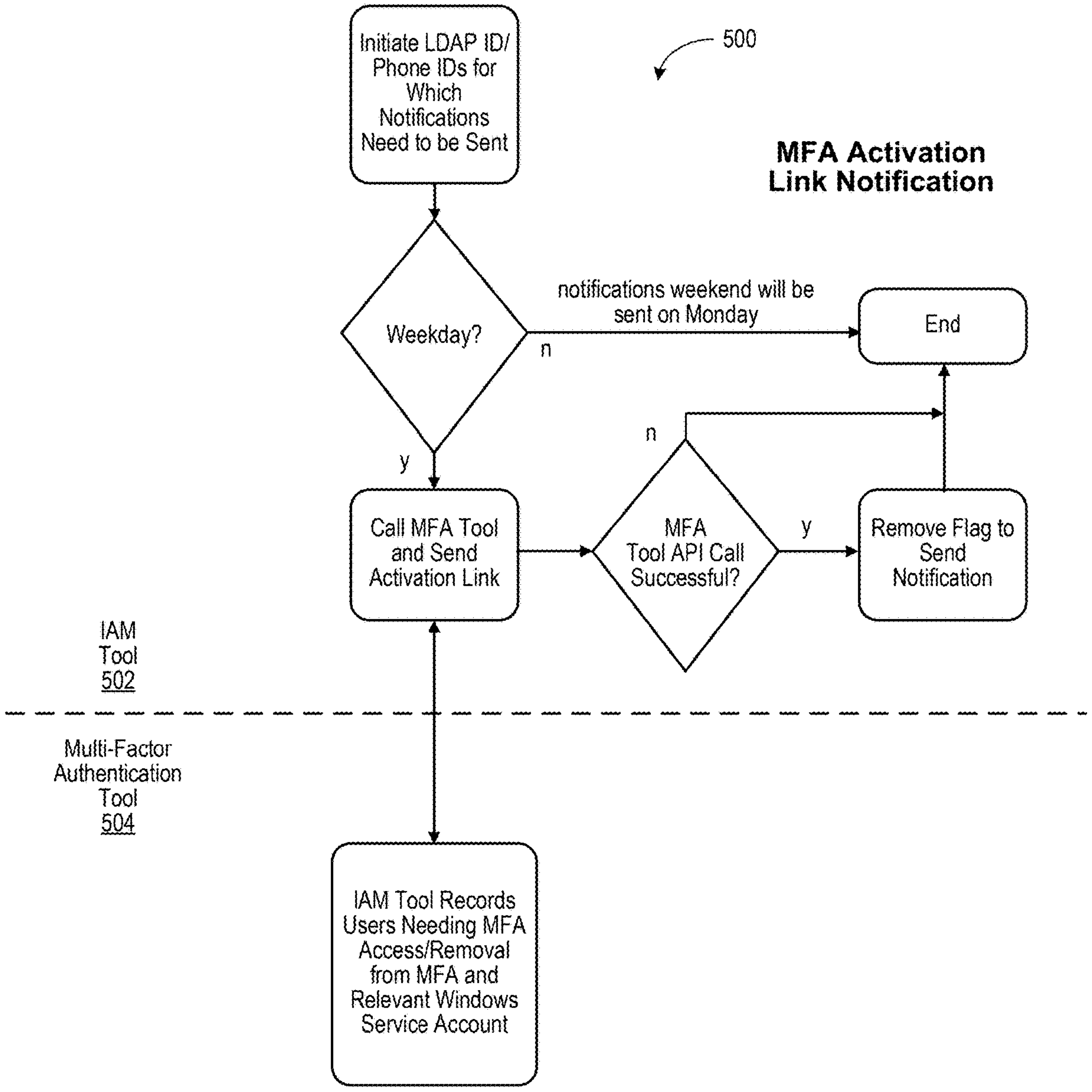
FIG. 5 is an automated MFA activation link notification workflow in accordance with some embodiments.

FIG. 5 is an automated MFA activation link notification workflow 500 for an IAM tool 502 and an MFA tool 504 in accordance with some embodiments. The IAM tool 502 iterates through each LDAP identifier and the phone identifiers for which a notification needs to be sent. If the current day is not a weekday, the workflow 500 ends (that is no notifications are sent on the weekend but are instead handled on Monday). If it is a weekday, the MFA tool 504 is called via an API to send an activation notification via a text message to the registered mobile number. If the MFA tool 504 call is not successful, the workflow 500 ends (e.g., the IAM tool 502 may log the error and retry on the next attempt). If the MFA tool 504 call was successful, the flag to send a notification is removed and the workflow 500 ends.

Figure 6:
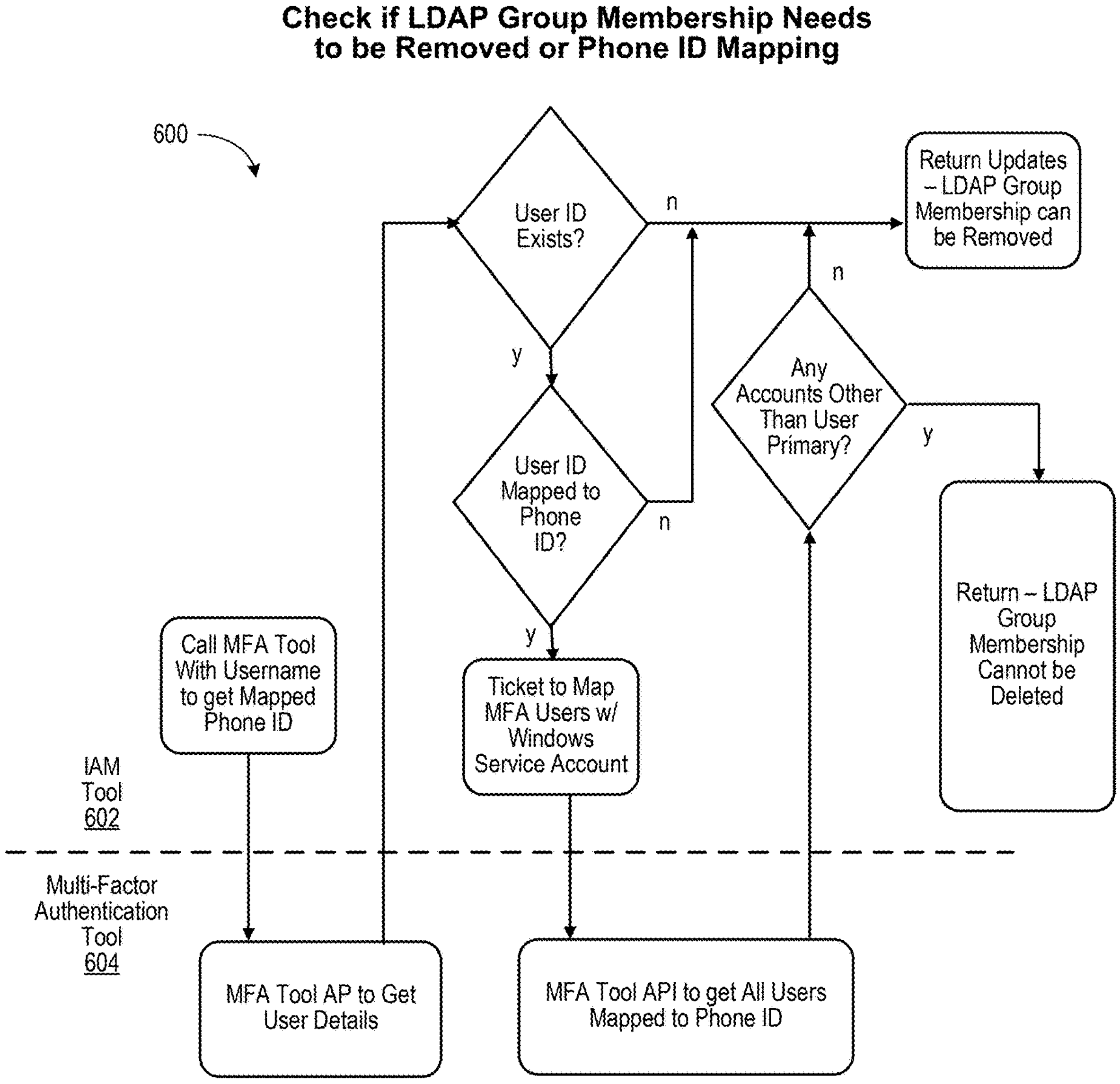
FIG. 6 is an automated Lightweight Directory Access Protocol ("LDAP") group membership check workflow according to some embodiments.

FIG. 6 is an automated LDAP group membership check workflow 600 (to see if LDAP group membership should be removed) for an IAM tool 602 and an MFA tool 604 according to some embodiments. The IAM tool 602 calls the MFA tool 604 with the username to get user details (e.g., mapped phone identifier). If the user identifier exists and the user identifier is mapped to a phone identifier, the MFA tool 604 is called to get all user accounts mapped to phone identifiers). If there are not any accounts other than the user primary and requested service account (or if the user identifier does not exist or the user identifier is not mapped to a phone identifier), an update is returned indicating that the LDAP group membership can be removed. If there are any accounts other than the user primary and requested service account, an update is returned indicating that the LDAP group membership cannot be deleted. The IAM tool 602 may also update a status to remove the phone identifier mapping from the service account.

Figure 7:
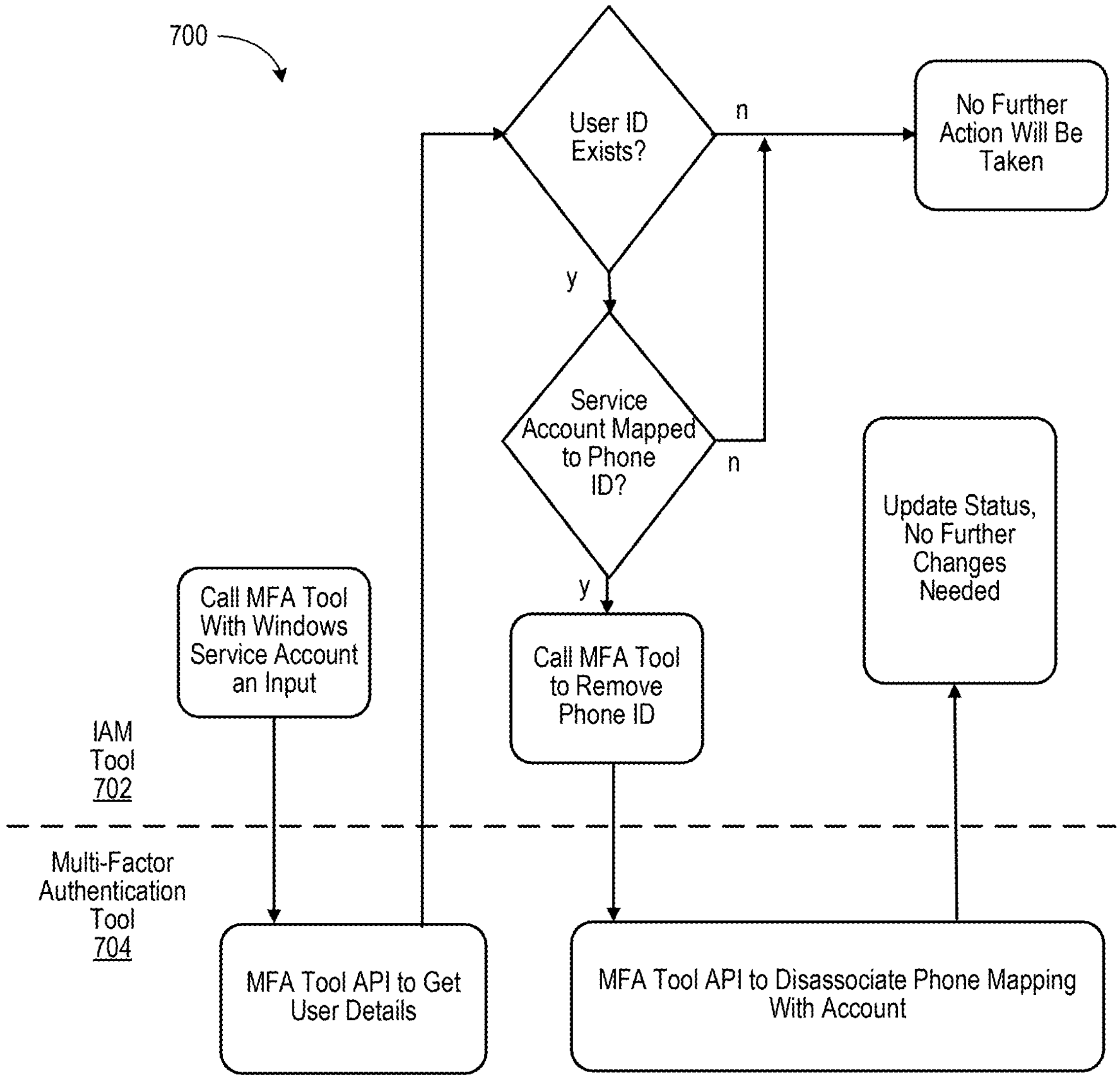
FIG. 7 is an automated remove phone identifier workflow in accordance with some embodiments.

FIG. 7 is an automated remove phone identifier workflow 700 for an IAM tool 702 and an MFA tool 704 in accordance with some embodiments. Initially, the MFA tool 704 is called with the Windows service account as an input, to get user details. If the user identifier does not exist or the service account is not mapped to a phone identifier, the workflow 700 ends. If the user identifier does exist and the service account is mapped to a phone identifier, the IAM tool 702 calls the MFA tool 704 to remove that phone identifier (i.e., disassociate the phone mapping with the account). The IAM tool 702 can then update the status and no further changes are needed.

To summarize, when using a mobile number as the second MFA factor, if the identified account qualifies for MFA and it is not currently enabled, the MFA is automatically enabled, and the following actions may be automatically performed:

- identify the mobile number for the account owner,
- set up an MFA profile (if it does not exist),
- associate accounts to the appropriate mobile numbers in MFA and send activation links, and
- the IAM tool automatically adds any required privileges via group memberships and performs synchronization with the MFA tool.

If the identified account does not qualify for MFA and it is currently enabled, the MFA is automatically removed.

According to some embodiments, accounts are grouped based on a User Principal Name ("UPN") to save on licensing cost. The UPN may comprise an account name of a user in an email address format (e.g., a user identification log-on name and domain name where the user account is located). Using the UPN to group accounts may, for example, reduce unnecessary duplicate accounts such as those created as a result of name variations (e.g., "Greg" versus "Gregory"), the addition of a middle initial, etc. Moreover, automatic termination of users from the MFA tool ensures compliance with the policy and may also on licensing cost. In addition, the removal of a mobile number from MFA tool helps avoid any unnecessary PII exposure. Any required maintenance to add or remove individuals from the MFA listing can be done using a ticketing system's service catalogs.

Figure 8:
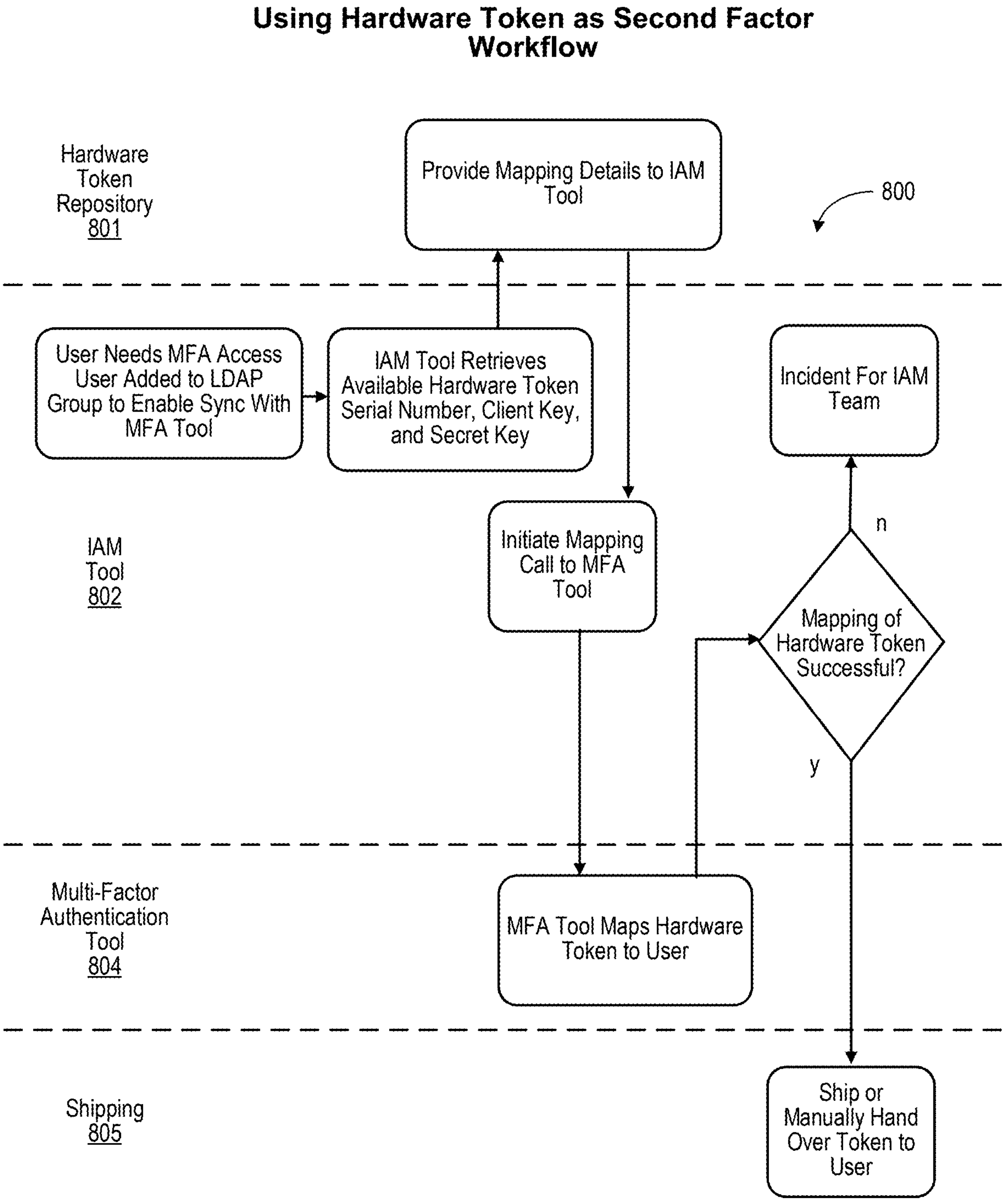
FIG. 8 is an automated hardware token as a second authentication factor workflow according to some embodiments.

Instead of (or in addition to) a mobile number, some embodiments may utilize a hardware token such as a security key fob or Universal Serial Bus ("USB") dongle, a programmable card, etc. FIG. 8 is an automated hardware token as a second authentication factor workflow 800 for a hardware token repository 801, an IAM tool 802, an MFA tool 804, and shipping 805 according to some embodiments. When the IAM tool 802 determines that a user needs MFA access, the user is added to the LDAP group to enable synchronization with the MFA tool 804. The IAM tool 802 retrieves an available hardware token serial number, client key, and secret key (with the hardware token repository 801 proving mapping details). The IAM tool 802 initiates a mapping call to the MFA tool 804 causing it to map the retrieved hardware token to the user. If the mapping of the hardware tokens is unsuccessful, an incident report is created for an IAM team to investigate and resolve. If the mapping of the hardware tokens was successful, shipping 805 arranges to deliver the token to the user and the workflow 800 ends.

Figure 9:
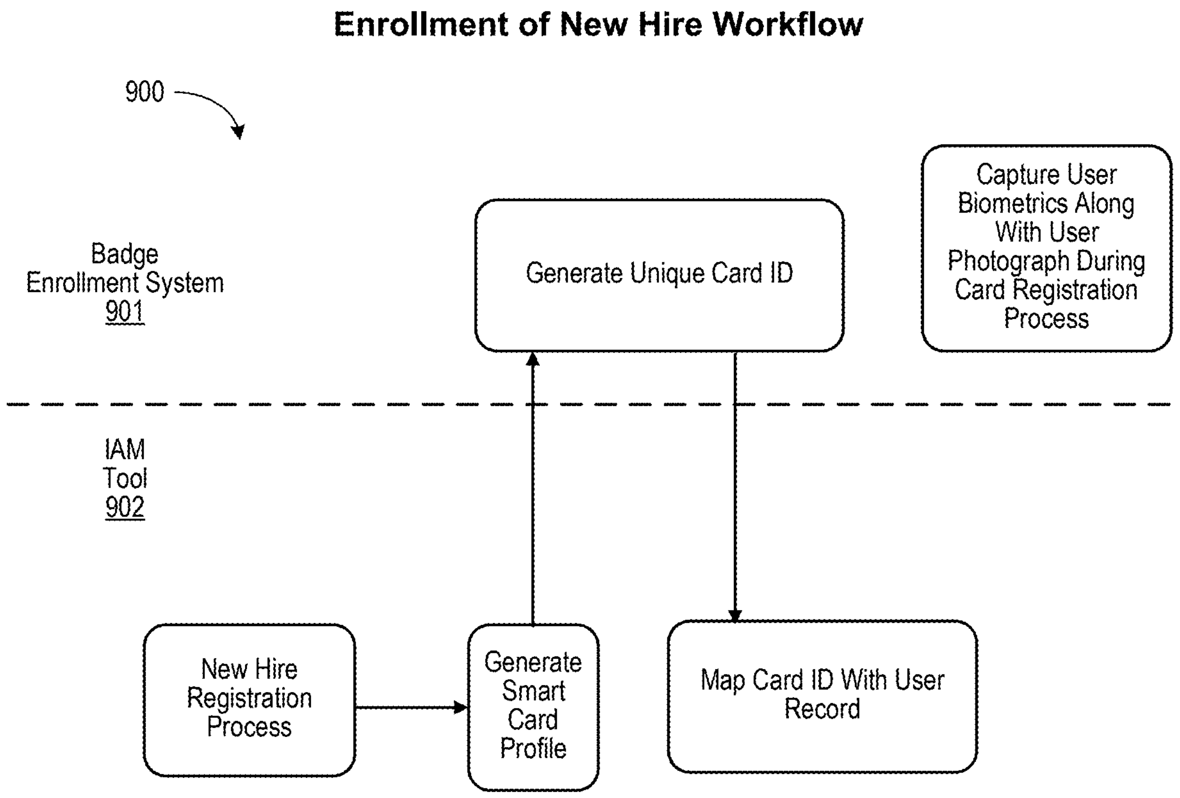
FIG. 9 is an automated enrollment of new hire workflow in accordance with some embodiments.

FIG. 9 is an automated enrollment of new hire workflow 900 for a badge enrollment system 901 and an IAM tool 902 in accordance with some embodiments. When the IAM tool initiates a new hire registration process, a smart card profile may be generated. As used herein, the phrase "smart card" may refer to any chip card or Integrated Circuit ("IC") card used to control access to a resource, such as a plastic credit card-sized card with an embedded IC chip. The badge enrollment system 901 generates a unique card identifier. The IAM tool 902 can then map the card identifier with the user record and the workflow 900 ends. If required, the badge enrollment system 901 captures user biometrics along with user photograph during the card registration process.

To summarize, when using hardware tokens as the second MFA factor, the system may:

- identify an employee who needs MFA access (same as the mobile number process),
- pick a hardware token serial number, client key, and secret from repository by IAM tool,
- register the serial number, client key, and secret with the MFA tool, and
- register the device and physically give it to the employee (if the employee is remote, the device may instead be shipped to the employee by a manager).

Figure 10:
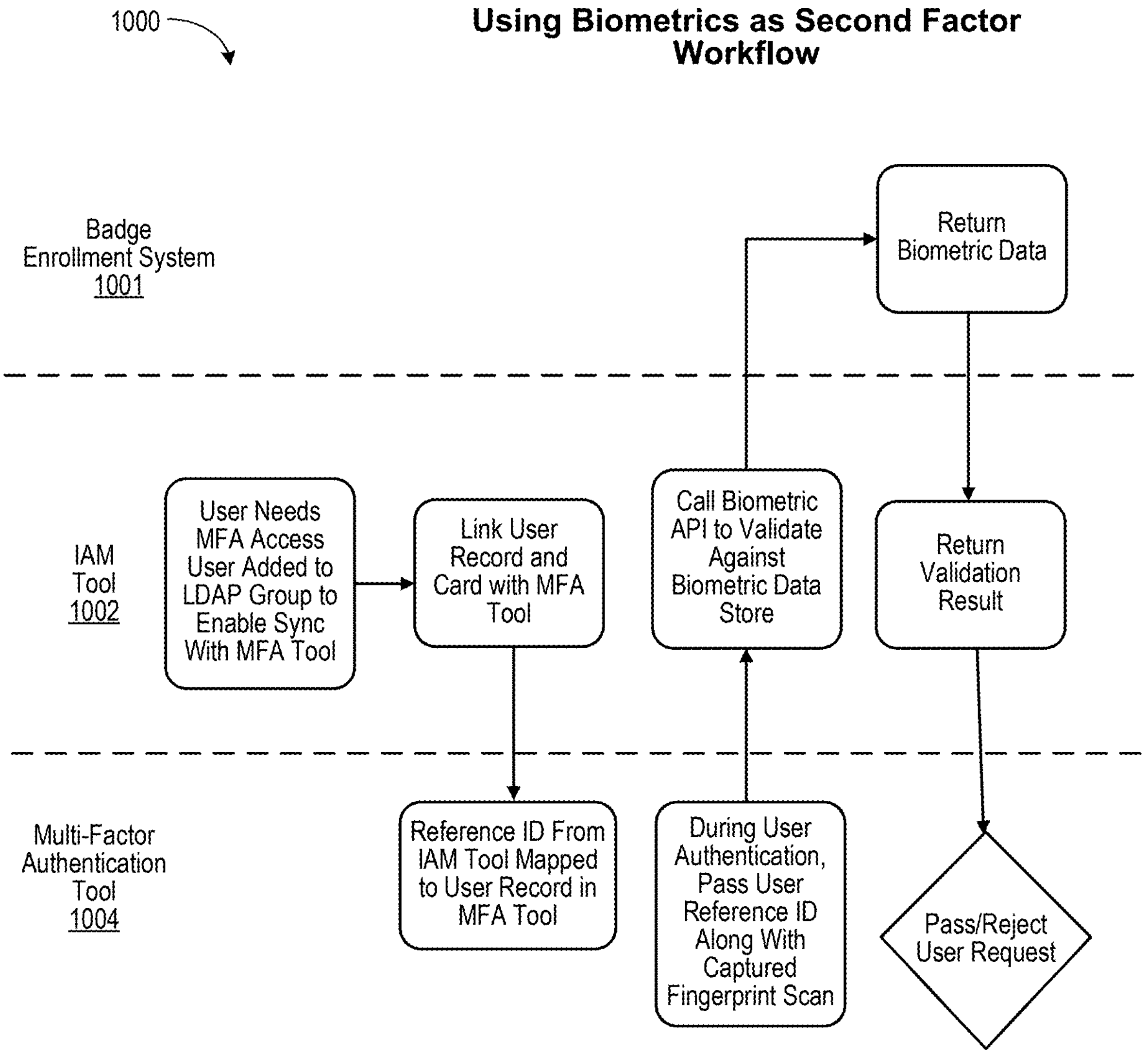
FIG. 10 is automated biometrics as a second authentication factor workflow according to some embodiments.

Instead of (or in addition to) a mobile number and/or hardware token, some embodiments may utilize biometric information such as a fingerprint, facial recognition, an iris scan, etc. FIG. 10 is automated biometrics as a second authentication factor workflow 1000 for a badge enrollment system 1001, an IAM tool 1002, and an MFA tool 1004 according to some embodiments. The IAM tool 1002 adds a user who needs MFA access to an LDAP group enabling synchronization with the MFA tool 1004. The MFA tool 1004 is used to link the user record and user identifier (e.g., the MFA tool 1004 maps the reference identifier from the IAM tool 1002 to the user record). During user authentication, the MFA tool 1004 passes the user reference identifier along with a captured fingerprint scan. The IAM tool 1002 calls a biometric API to validate scan based on the biometric data store. The badge enrollment system 1001 returns biometric data, and the IAM tool 1002 returns a validation result so that the MFA tool 1004 can pass or reject the user request and the workflow 1000 ends.

To summarize, when using biometrics as the second factor the system may:

- identify an employee who needs MFA access (same as during the mobile phone number process),
- during the employee's smart card issuance (e.g., new hire process), biometrics such as a fingerprint scan and/or retina scan are captured,
- the IAM tool maps the employee smart card and biometrics with the employee's profile,
- a unique reference is generated for each association,
- this unique reference is then mapped in the MFA tool, and
- employees use their fingerprint to satisfy an MFA requirement (e.g., on their company-owned laptop).

Figure 11:
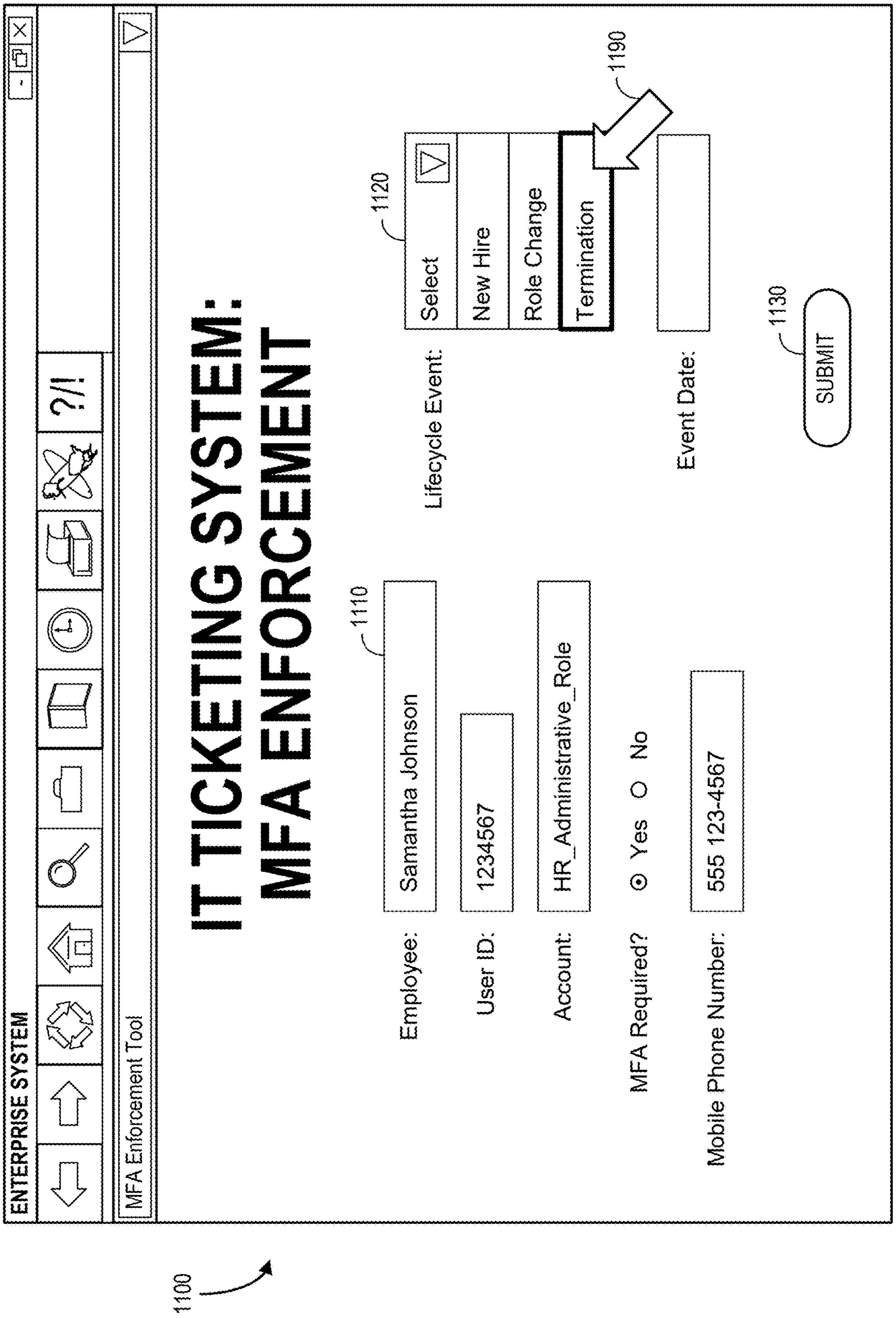
FIG. 11 is a ticketing tool display in accordance with some embodiments.

FIG. 11 is an IT ticketing display 1100 in accordance with some embodiments. The display 1100 may be used, for example, to create IT tickets associated with administrative account lifecycle events and MFA enforcement. The display 1100 includes a data entry area 1110 to enter information such as an employee name, user identifier, account information, MFA requirement information, a mobile phone number, etc. The display 1100 can also has a lifecycle event data entry area 1120 to enter a lifecycle event type via a dropdown menu (e.g., using a pointer 1190 to select new hire, role change, or termination) and an event date. A user may also select a "Submit" icon 1130 to send the information to an enterprise IT ticketing system in accordance with any of the embodiments described herein.

Figure 12:
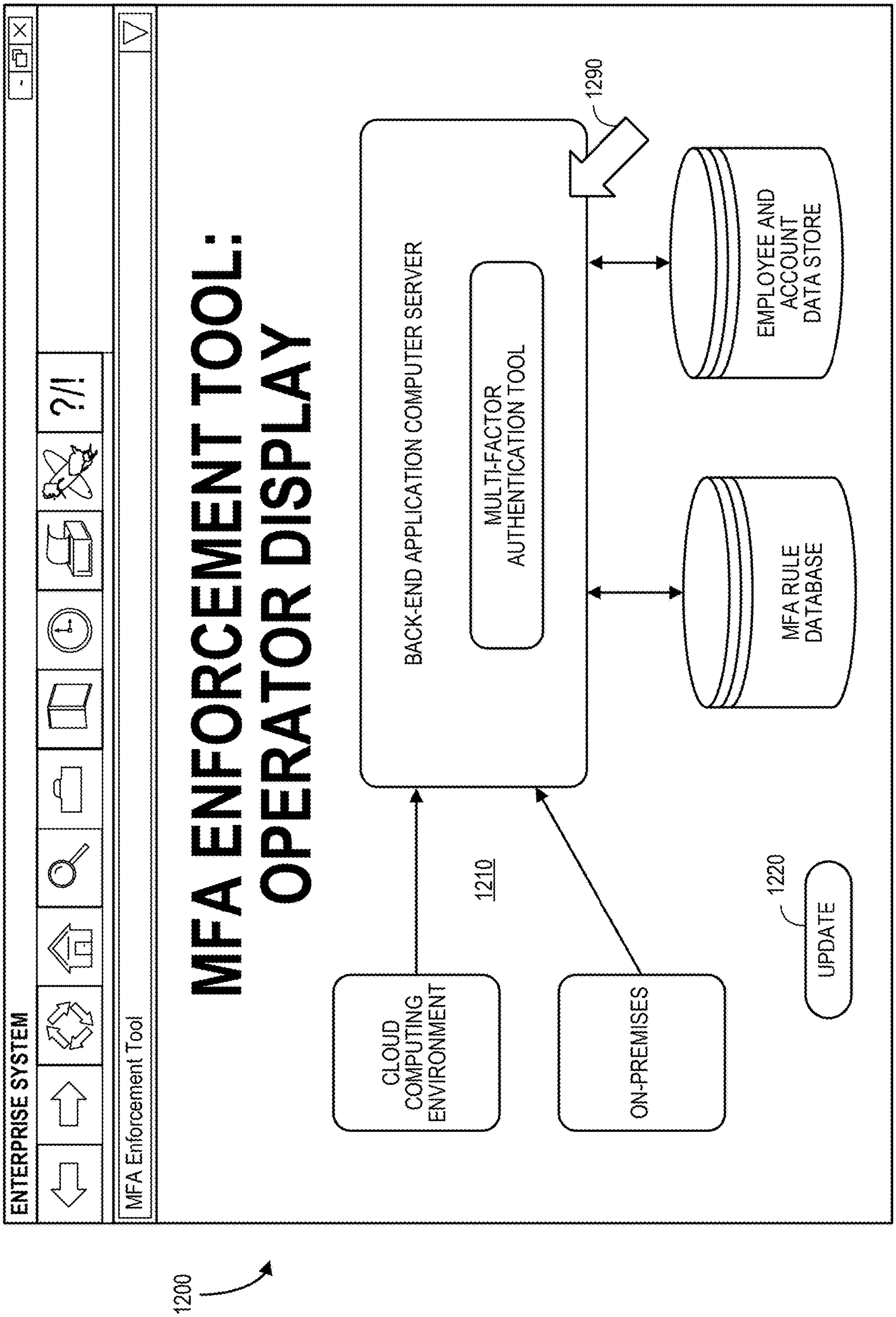
FIG. 12 is an operator or administrator display according to some embodiments.

The operation of an enterprise multi-factor authentication enforcement system may be controlled via a Graphical User Interface ("GUI"). For example, FIG. 12 is an enterprise multi-factor authentication enforcement system operator or administrator display 1200 including graphical representations of elements of such a tool 1210 according to some embodiments. Selection of a portion or element of the display 1200 via a touchscreen or pointer 1290 might result in the presentation of additional information about that portion or element (e.g., a popup window presenting data mappings, MFA requirement details, etc.) or let an operator or administrator enter or annotate additional information about multi-factor authentication enforcement (e.g., based on changes to system configuration, new MFA requirements). An "Update" icon 1220 might let the administrator save updates and changes to the tool 1210.

Figure 13:
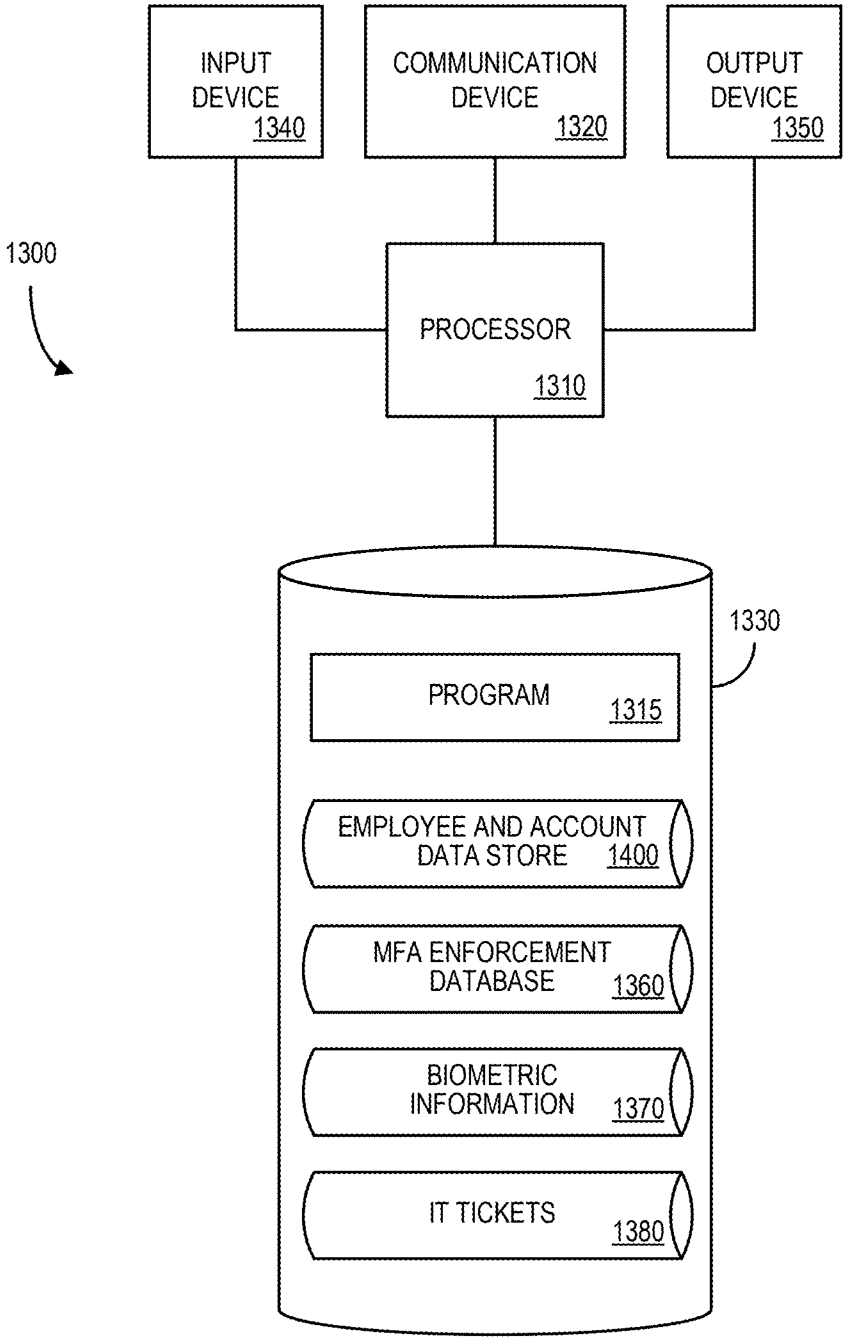
FIG. 13 is a block diagram of an apparatus in accordance with some embodiments.

The embodiments described herein may be implemented using any number of different hardware configurations. For example, FIG. 13 illustrates an apparatus 1300 that may be, for example, associated with the system 100 described with respect to FIG. 1 (or any other system described herein). The apparatus 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote cloud or on-premises systems, administrators, enterprise employees, and/or communication devices (e.g., PCs and smartphones). Note that communications exchanged via the communication device 1320 may utilize security features, such as those between a public internet user and an internal network of an insurance company and/or an enterprise. The security features might be associated with, for example, web servers, firewalls, and/or PCI infrastructure. The apparatus 1300 further includes an input device 1340 (e.g., a mouse and/or keyboard to enter information about MFA requirements and employee roles, etc.) and an output device 1350 (e.g., to output reports regarding enterprise MFA enforcement, recommendations, alerts, etc.).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1315 and/or an MFA enforcement tool or application for controlling the processor 1310. The processor 1310 performs instructions of the program 1315, and thereby operates in accordance with any of the embodiments described herein. For example, the processor 1310 may scan a computing environment to automatically detect administrative account lifecycle events for an enterprise. Responsive to the identified administrative account lifecycle events, the processor 1310 may automatically determine modifications to MFA requirements. Responsive to the determination, the processor 1310 may automatically implement second factor mappings to enforce the MFA requirements. The second factor mappings might be associated with, for example, mobile phone numbers, hardware tokens, and biometric information.

The program 1315 may be stored in a compressed, uncompiled and/or encrypted format. The program 1315 may furthermore include other program elements, such as an operating system, a database management system, and/or device drivers used by the processor 1310 to interface with peripheral devices.

As used herein, information may be "received" by or "transmitted" to, for example: (i) the apparatus 1300 from another device; or (ii) a software application or module within the apparatus 1300 from another software application, module, or any other source.

In some embodiments (such as shown in FIG. 13), the storage device 1330 further includes an employee and account data store data store 1400, an MFA enforcement database 1360 (e.g., containing MFA requirements), biometric information 1370 (e.g., fingerprint and facial scans), and IT tickets 1380 (e.g., documenting administrative account lifecycle events). An example of a database that might be used in connection with the apparatus 1300 will now be described in detail with respect to FIG. 14. Note that the database described herein is only an example, and additional and/or different information may be stored therein. Moreover, various databases might be split or combined in accordance with any of the embodiments described herein. For example, the MFA enforcement database 1360 and IT tickets 1380 might be combined and/or linked to each other within the program 1315.

Referring to FIG. 14, a table is shown that represents the c 1400 that may be stored at the apparatus 1300 according to some embodiments. The table may include, for example, entries associated with different employees of an enterprise. The table may also define fields 1402, 1404, 1406, 1408, 1410 for each of the entries. The fields 1402, 1404, 1406, 1408, 1410 may, according to some embodiments, specify: an employee identifier 1402, an account status 1404, an MFA requirement 1406, a current MFA 1408, and a status 1410. The employee and account data store 1400 may be created and updated, for example, when an employee is hired or terminated, an employee role change occurs, a computing landscape is updated, etc.

The employee identifier 1402 may be, for example, a unique alphanumeric code associated with an employee of an enterprise. The account status 1404 might indicate if the type of computer account that is associated with that employee should be classified as "administrative" or "non-administrative." The MFA requirement 1406 may indicate if multiple factors of authentication (e.g., two or three factors) should be required based on the account status 1404. The current MFA 1408 indicates if the computer account that is associated with the employee currently requires multiple forms of authentication. The status 1410 might indicate, for example, that an employee account should add MFA, remove MFA, or that no action is required (e.g., based on the account status 1404 and the current MFA 1408).

Thus, embodiments may continuously monitor computer accounts, and if it identifies that an account got added to one or more administrative groups, then an MFA requirement is enforced automatically in the background. Automated enforcement of MFA requirements may help ensure that administrative accounts are compliant with applicable MFA rules. Likewise, whenever an account is removed from administrative groups, the system may automatically disable the MFA requirement for that account in the background. Thus, MFA requirements may be adhered to throughout an administrative account's life cycle.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 15:
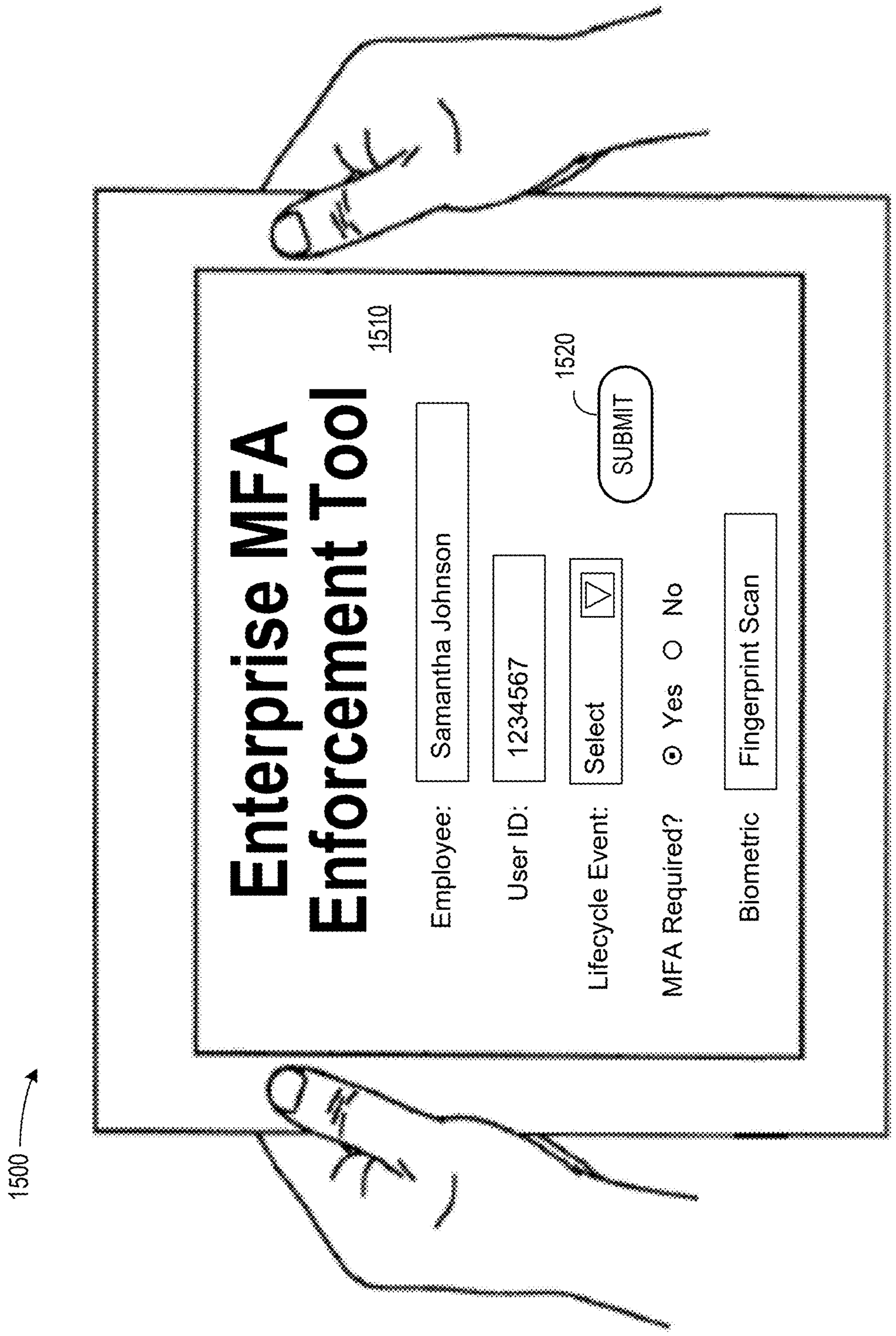
FIG. 15 is a tablet computer according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises, embodiments may instead be associated with other types of insurers, businesses, and organizations instead. FIG. 15 illustrates a handheld tablet 1500 in accordance with some embodiments. An enterprise MFA enforcement tool display 1510 might, for example, let an operator create IT tickets for an enterprise via a "Submit" icon 1520. Note that embodiments might be associated with any type of business (e.g., insurance companies, financial enterprises, educational institutions, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A Multi-Factor Authentication ("MFA") enforcement system for an enterprise, comprising:

(a) an employee and account data store that contains electronic records associated with a plurality of employees and cloud computing accounts for the enterprise; and (b) an MFA tool, in communication with an Identity and Access Management ("IAM") tool and coupled to the employee and account data store, including:

a computer processor, and a computer memory coupled to the computer processor and storing instructions that, when executed by the computer processor, cause a back-end application computer server associated with the MFA tool to:

scan a computing environment, associated with Lightweight Directory Access Protocol ("LDAP"), along with the employee and account data store to automatically detect administrative account lifecycle events for the enterprise, responsive to the identified administrative account lifecycle events, automatically determine modifications to MFA requirements, and responsive to the determination, automatically implement second factor mappings, associated with hardware tokens, to enforce the MFA requirements, wherein the automatic implementation of second factor mappings to enforce the MFA requirements includes determining that an identified account qualifies for MFA but is not currently enabled and, as a result:

selecting hardware token serial numbers, client keys, and secrets from a repository by the IAM tool, registering, by the IAM tool, the serial numbers, client keys, and secrets with the MFA tool, and arranging to physically provide the hardware token to the employee.

2. The system of claim 1, wherein the lifecycle events are associated with at least one of: (i) onboarding a newly hired employee of the enterprise, (ii) an indication that an employee has a new role, (iii) an employee termination.

3. The system of claim 1, wherein the second factor mappings are associated with mobile phone numbers.

4. The system of claim 3, wherein the automatic implementation of second factor mappings to enforce the MFA requirements includes determining that an identified account qualifies for MFA but is not currently enabled and, as a result:

automatically enabling MFA, identifying a mobile phone number for an account owner, setting up an MFA profile, associating accounts to appropriate mobile numbers in MFA, and transmitting activation links.

5. The system of claim 4, wherein the IAM tool automatically adds any required privileges via group memberships and performs synchronization with the MFA tool.

6. The system of claim 4, wherein MFA is automatically removed if the identified account does not qualify for MFA and MFA is currently enabled.

7. The system of claim 4, wherein accounts are grouped based on User Principal Names ("UPN").

8. The system of claim 1, wherein the second factor mappings are associated with biometric information.

9. The system of claim 8, wherein the automatic implementation of second factor mappings to enforce the MFA requirements includes determining that an identified account qualifies for MFA but is not currently enabled and, as a result:

during issuance of a smart card to the employee, capturing biometrics, mapping, by an IAM tool, the employee smart card and biometrics with employee's profile, generating a unique reference for each mapping, and mapping, by the MFA tool, the unique reference.

10. The system of claim 1, wherein the automatic detection of an administrative account lifecycle event is associated with an Information Technology ("IT") ticketing application.

11. The system of claim 1, further comprising:

(c) a communication port coupled to the back-end application computer server to facilitate an exchange of data with a remote device via a distributed communication network to support interactive user interface displays that include information about the second factor mappings to enforce the MFA requirements.

12. A Multi-Factor Authentication ("MFA") enforcement method for an enterprise, comprising:

scanning, by a computer processor of an MFA tool associated with a back-end computer server and in communication with an Identity and Access Management ("IAM") tool, a computing environment, associated with Lightweight Directory Access Protocol ("LDAP"), along with an employee and account data store to automatically detect administrative account lifecycle events for the enterprise, wherein the employee and account data store contains electronic records associated with a plurality of employees and cloud computing accounts for the enterprise;

responsive to the identified administrative account lifecycle events, automatically determining modifications to MFA requirements; and responsive to the determination, automatically implementing second factor mappings, associated with hardware tokens, to enforce the MFA requirements, wherein the automatic implementation of second factor mappings to enforce the MFA requirements includes determining that an identified account qualifies for MFA but is not currently enabled and, as a result:

selecting hardware token serial numbers, client keys, and secrets from a repository by the IAM tool, registering, by the IAM tool, the serial numbers, client keys, and secrets with the MFA tool, and arranging to physically provide the hardware token to the employee.

13. The method of claim 12, wherein the lifecycle events are associated with at least one of: (i) onboarding a newly hired employee of the enterprise, (ii) an indication that an employee has a new role, (iii) an employee termination.

14. The method of claim 12, wherein the second factor mappings are further associated with at least one of: (i) mobile phone numbers, and (ii) biometric information.

15. A non-transitory computer-readable medium storing instructions, that, when executed by a processor, cause the processor to perform a multi-factor authentication (MFA) enforcement method for an enterprise, the method comprising:

scanning, by a computer processor of an MFA tool associated with a back-end computer server and in communication with an Identity and Access Management ("IAM") tool, a computing environment, associated with Lightweight Directory Access Protocol ("LDAP"), along with an employee and account data store to automatically detect administrative account lifecycle events for the enterprise, wherein the employee and account data store that contains electronic records associated with a plurality of employees and cloud computing accounts for the enterprise;

responsive to the identified administrative account lifecycle events, automatically determining modifications to MFA requirements; and responsive to the determination, automatically implementing second factor mappings, associated with hardware tokens, to enforce the MFA requirements, wherein the automatic implementation of second factor mappings to enforce the MFA requirements includes determining that an identified account qualifies for MFA but is not currently enabled and, as a result:

selecting hardware token serial numbers, client keys, and secrets from a repository by the IAM tool, registering, by the IAM tool, the serial numbers, client keys, and secrets with the MFA tool, and arranging to physically provide the hardware token to the employee.

16. The non-transitory computer-readable medium of claim 15, wherein the second factor mappings are further associated with at least one of: (i) mobile phone numbers, and (ii) biometric information.

* * * * *